Figures 1, 2:
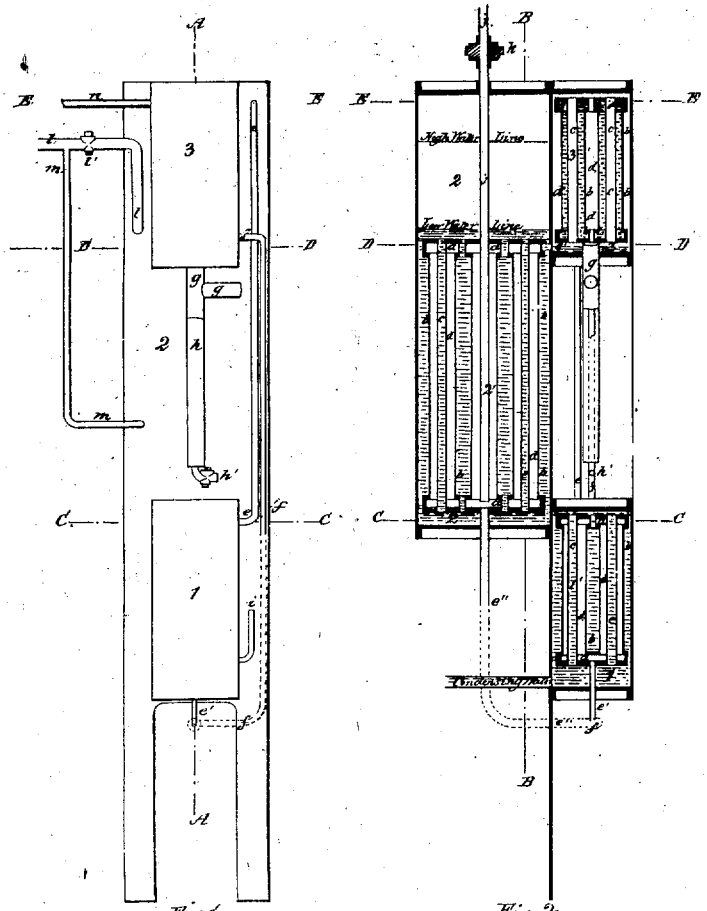

BEST AVAILABLE COPY

2 Sheets-Sheet 1.

T. Prosser,

Steam-Boiler Condenser.

No. 2,255. Reissued May 22, 1866.

Witnesses
J. W. Coombs
G. W. Reed

Inventor.
Thomas Prosser
Per Brown Coombs & Co
Attys

2 Sheets-Sheet 2.
T. Prosser,
Steam-Boiler Condenser.
No. 2,255. Reissued May 22, 1866.
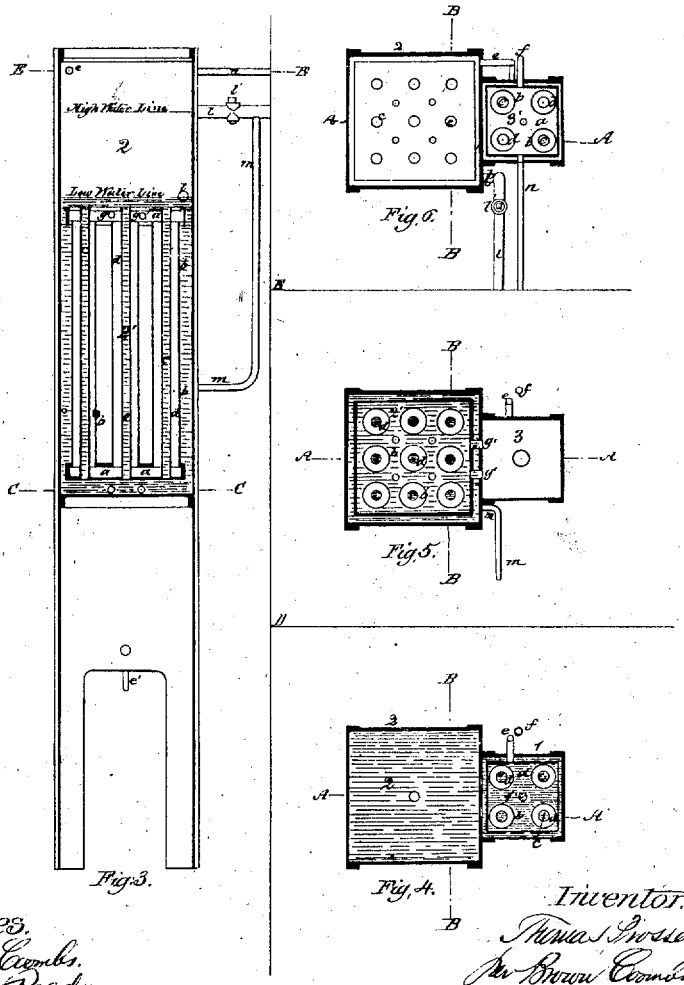
Witnesses.
J. W. Crumbs.
E. W. Reed.
Inventor.
Thomas Prosser.
Per Brown Crumbs & Co
Attys.

UNITED STATES PATENT OFFICE.

THOMAS PROSSER, OF NEW YORK, N. Y.

IMPROVEMENT IN SURFACE-CONDENSERS.

Specification forming part of Letters Patent No. 18,861, dated December 15, 1857; antedated October 31, 1854; Reissue No. 2,255, dated May 22, 1866.

DIVISION B.

*To all whom it may concern:*

Be it known that I, THOMAS PROSSER, of the city, county, and State of New York, have invented a new and useful Improvement in Surface-Condensers; and I do hereby declare that the following is a full, clear, and exact description of the same, reference being had to the accompanying drawings, forming part of this specification.

This invention relates to obtaining distilled water from the condensing-water in the close condensing-cistern of a surface-condenser by the conversion of a portion of the said condensing-water into vapor by the heat of the exhaust-steam from an engine, or of any steam passing through the condenser, and the subsequent condensation of such vapor by the cool incoming condensing-water.

The apparatus employed in carrying out my invention may be considerably varied in its construction and arrangement; but I prefer an apparatus composed of three distinct condensers, which I term, respectively, the "heater-condenser," the "main condenser," and the "distilling-condenser," arranged one above another, each in its separate cistern, and have for that reason represented such an apparatus in the drawings. These condensers may be variously constructed; but I prefer that each should be as represented, composed of two hollow slabs, such as are the subject of my Letters Patent No. 10,450, dated January 24, 1854, or other equivalent chambers communicating by means of annular spaces with each other, such annular spaces being formed by means of tubes, one within the other, the inner ones passing quite through both chambers, while the outer ones merely enter into them.

The bottom cistern first receives the cold condensing-water, while the distilling-condenser therein receives the vapor of a portion of that same water after it has become sufficiently heated by passing through the cistern next above it containing the main condenser. Each of these two condensers has a pipe from its lowest part through the bottom of its respective cistern, and the water is drawn from the two cisterns by means of two pumps, one for each cistern, which force it through the upper or heater condenser into the boiler. The cistern in which the heater-condenser is placed first receives the exhaust-steam from the engine or steam from any other source to be condensed, and thereby the water within the heater-condenser has its temperature increased, while the uncondensed steam passes into the main condenser, together with the water resulting from condensation. All the steam which has become condensed before entering the apparatus, together with any filth that may accumulate in the exhaust-pipe or other inlet-pipe by which steam enters the apparatus, are collected in a vessel or catch-pit below it and go to waste. The uncombined or free air contained in the two internal condensers (main condenser and distilling-condenser) is allowed to escape with the distilled water through a pipe from the bottom of each by means of a branch pipe therefrom, and in the case of the main condenser a stop-cock is necessary for closing its respective pipe when working under pressure greater than that of the atmosphere, thereby (when the condensing-water is properly limited) causing the water in its cistern to boil sufficiently to supply the distilling-condenser with vapor for condensation to make up for waste or for other purposes. There is also a stop-cock to regulate the quantity of exit hot condensing which shall be allowed to escape.

It will thus be seen that the main condenser and distilling-condenser are both internal condensers, the main condenser condensing the steam which enters the apparatus from the exhaust-pipe of the engine, or by any other inlet-pipe, and the distilling-condenser condensing the vapor from the main cistern or hot well, while the heater-condenser acts upon the steam externally to condense only a portion of it.

When steam is free to escape into the atmosphere through the condenser its temperature will scarcely exceed the boiling-point of 212° Fahrenheit, and consequently the water in the heater-condenser can never reach it, much less can that in the main condenser, even when there is deficient supply of water for condensation. The working under a pressure greater than that of the atmosphere within the condenser has therefore for its object the supplying of feed-water at a high temperature and vapor from the hot-well of a sufficient elasticity to force itself in sufficient volume into the distilling-condenser below.

That the nature of my invention and the means which I adopt of carrying the same into effect may be fully understood, I will proceed to describe the drawings annexed, first premising that the same marks of reference refer alike to similar parts in each figure.

Figure 1 is a front elevation of the two cisterns 1 and 3, containing the distilling-condenser and the heater-condenser, behind which is the main condenser-cistern 2. Fig. 2 is a vertical section through the center of Fig. 1, on the line A—that is to say, through the distilling-condenser, main condenser, and heater-condenser, together with the cisterns 1, 2, and 3, inclosing them. Fig. 3 is also a vertical section through the main condenser 2′ and the cistern 2, which contains it, on the line B, Fig. 2. Figs. 4, 5, and 6 are horizontal sections through the foregoing Figs. 1, 2, and 3, and on the lines marked, respectively, C, D, and E.

The condensers 1′, 2′, and 3′ are each composed as follows, in which *a a* are the hollow slabs or chambers, *b b* the tubes connecting the top of the one with the bottom of the other, and *c c* the tubes passing through the tubes *b b* as well as through the hollow slabs or chambers *a a*, forming annular spaces *d d*, within which nothing but steam and vapor or the water resulting from their condensation is allowed to enter.

I will here remark that by "steam" I mean the eduction or exhaust steam from the enigne or other steam entering through the heater-condenser, and by "vapor" that from the cistern of the main condenser or the water resulting from their condensation is allowed to enter.

*e* is a pipe from the top of the cistern 2, to convey the vapor into the distilling-condenser 1′, at the bottom of which a pipe, *e′*, collects the results in water through the bottom of the cistern 1 containing it, and in like manner *e″* is a pipe from the bottom of the main condenser 2′, and through the bottom of the cistern 2 containing it, for the purpose of collecting the water resulting from the condensation of the steam within the one, 2′, and of the vapor within the other, 1′. Each pipe must have a separate pump to draw off the water; but one pipe, *f*, may receive the discharge of both and convey it into the heater-condenser 3′ outside of which, and within the cistern 3 containing it, the clean exhaust or other steam first enters (having deposited all filth, together with the steam previously condensed, in the catch-pit *h*, from which it is blown off at interval through the cock *h′*) by the pipe *g*. The steam, after acting upon the heater-condenser 3′, will have some portion condensed, and this is prevented from returning by the pipe *g* being continued higher than the holes *g′ g′* of communication with 2′, and therefore the whole escapes together through the holes *g′ g′* into the main condenser 2′, where the water which surrounds it is supposed to be boiling, and is contained in the cistern 2. As the steam after it has left the cistern 3 is still hot enough to boil the water in the cistern 2, it is of course hot enough to produce a higher temperature in the heater-condenser 3′, through which the feed-water is forced into the boiler through the pipes *n* and *f*.

At the bottom of the main-condenser cistern 2 the water is much colder than at the top, and of course the steam is also colder, and has become water in consequence of condensation. This water is nevertheless collected at a high temperature, and through the medium of the pipe *f*, as before stated, pumped, together with that from the distilling-condenser 1′, into and through the heater-condenser 3′ into the boiler.

*i*, Fig. 1, is a pipe from the bottom of condenser 1′ to allow of the escape of any free or uncombined air; or the same may be effected through the pipe *e′*.

J is also a pipe for a similar purpose to *i*, but proceeds upward from the top of the bottom hollow slab of the condenser 2′, as also to enable an engine to which this condenser may be applied instantly to assume the character of a non-condensing high-pressure one. In fact it will assume that character automatically when the operation of the condenser 1′ is not required, and also when the cock *k* is open in consequence of derangement to the pump or a deficient supply of condensing-water at the same time that any other source of feed-water supply is opened.

I will here remark that the cock *k* is only required to be shut when a recuperative supply of water to make up for the waste is required from the condenser 1′.

*l* is the waste-pipe, upon which a cock, *l′*, is placed to regulate the amount which shall be allowed to flow from the cistern 2 between the lines marked "high-water level" and "low-water level," the latter being produced by the pressure of the superincumbent vapor above the water. But lower than this the water must not be allowed to go, because the whole of the condensing-water will then make its exit through the pipe *m* into *l* beyond the point where the cock *l′* has any control, as it is entirely open. The cock *k* being shut, therefore the cock *l′* fully controls the temperature and consequent pressure of the vapor in the cistern 2 by admitting the whole or only a portion of the condensing-water to pass off through its ample capacity, for none will pass by the pipe *m* when *l′* is open, in consequence of the column of water in *m* being so much heavier than that connected with the pipe *l*.

The proportional surface of each condenser will vary with circumstances, but ordinarily it is presumed that the distilling-condenser and the heater-condenser, each having from one-tenth to one-fifth as much surface as the main condenser, will give excellent results when the steam-boiler pressure is from eighty to one hundred pounds to the square inch, and cut off from the engine at from one-half to two-thirds the stroke.

The temperature of the feed-water will probably be, on the average, about 16° to 18° above that of the exit hot condensing-water, and the same below that of the steam entering the heater-condenser cistern 3. This high temperature is obtained in consequence of the small capacity of the annular condenser into which the exhaust-steam is expanded, after having expanded first in the cylinder of an engine and next in the heater-condenser cistern 3. The reason why so little difference of temperature is anticipated lies in the fact of water at high temperatures absorbing heat far more rapidly than at low temperatures, and particularly when in a state of violent ebullition; for it may be observed that water, when heated to a less temperature than that necessary to produce ebullition, absorbs heat very slowly, and of course very little can escape as vapor; but the moment violent ebullition commences the absorption is very rapid, as is evinced by the copious discharge of vapor. The absorption of caloric must be in proportion to its evolution, and, as vapor contains in the same weight about six times as much as water at the same temperature, it is probable that the same proportion holds good with regard to the amount of caloric absorbed. Leslie asserts that water at 212° conducts heat five times more rapidly than it does at about 32°, and Parks made some experiments which went to show that hot water abstracts heat faster than iron will allow it to pass through in the proportion of twenty-six to ten; but the culinary phenomenon of a boiling tea-kettle shows that the caloric will pass through the metallic bottom apparently without affecting it at all—nay, even its temperature will become reduced, inasmuch as the hand may be borne against it when the water boils, but not before.

I would observe that, simultaneously with the entrance of the condensing-water into the cistern 1, the steam enters cistern 3, the latter passes through the holes $g'$ $g'$ into the condenser 2′, while the condensing-water, somewhat raised in temperature, passes from the cistern 1 into the cistern 2, and consequently outside of the condenser 2′, wherein the steam becomes condensed. At the same time the vapor from cistern 2 enters condenser 1 and becomes condensed also. Then the resulting water of condensation of both steam and vapor commingle, and all passes through the heater-condenser 3′ into the boiler or to a suitable receptacle.

Supposing the apparatus to be applied in connection with the exhaust-pipe of an engine, in starting the engine the cock $k$ should be left open for a few minutes to allow the air within the main condenser to escape, or it may be left open until necessary to close it, in order to supply water to make up for the waste. If a moderate quantity only is required, the cock $l'$ may be left open, but if more is required, it may be partially shut, which will increase the temperature of the vapor in proportion to the depression which it produces upon the surface of the water, which must never be allowed below the low-water line.

Now, it may be proper to observe that, in consequence of the small portion of the condensing-water which is required to be evaporated to supply the waste, there is no probability of the saturation being sufficient to cause a deposit upon the condenser to an injurious extent far less than must have occurred had the same water been used in the boiler, wherein all the solid matter contained in the water must necessarily be deposited.

Ordinary lime-waters will, however, coat the condenser with carbonate of lime, which is readily removed, and once in one year will be quite sufficiently frequent. In the case of sea-water, however, the ordinary deposit is sulphate of lime, but as this does not deposit until the water is nearly saturated and the temperature amounts to 217° Fahrenheit, it is not contemplated that any difficulty will arise from this deposit, which is so ruinous to sea-going steamers. These facts were developed by Faraday nearly thirty years ago, but this is the first practical embodiment of them to the purposes of the economic working of the steam-engine known to the writer.

In case of accident or non-supply of condensing-water the water should be run out at the cistern 1, and the cock $k$ being open, the engine will work as a common non-condensing engine, and the boiler may be supplied with feed-water by means which will readily suggest themselves. If, however, the hand-holes in the main condenser-cistern are removed, so as to allow a free ingress and egress of air, a portion of the steam will still be condensed, and still more if a blower is made to force the air into the cistern. The waste condensing hot water may be made to pass through another condenser-like apparatus, called in that case an "attemperater," for the purpose of warming air or water, whereby a large portion of the fuel consumed may be utilized, far more, indeed, than by any other means; and, finally, the entire condensation may be produced with air or partly with air and partly with water. It is scarcely necessary to add that the waste boiling-hot condensing-water and the vapor arising therefrom are both available for cooking purposes at no cost whatever for fuel.

In conclusion, I may state that the amount of condensing-water needed by my system of condensation will ordinarily be about four times that of the feed-water, which is only about five per cent. of the amount ordinarily required for other surface-condensers.

When my improved condenser is employed as an apparatus for obtaining distilled water from steam other than that which has been used in a steam-engine, or from steam which has been used in any other apparatus than a steam-engine, it is set in operation, and its operation continues in the same manner as when used in connection with a steam-engine, as hereinabove described.

What I claim as my invention, and desire to secure by Letters Patent, is—

A surface-condenser constructed to obtain distilled water from the condensing-water by making the heat of the steam to be condensed convert a portion of the condensing-water into vapor, and afterward condensing such vapor by the cool incoming condensing-water by means of a distilling-condenser, substantially as herein described.

THOMAS PROSSER.

Witnesses:
HENRY T. BROWN,
GEO. W. REED.